United States Patent

Kinugasa et al.

US005783160A

[11] Patent Number: 5,783,160
[45] Date of Patent: Jul. 21, 1998

[54] METHOD FOR PURIFYING COMBUSTION EXHAUST GAS

[75] Inventors: Yukio Kinugasa; Kouhei Igarashi, both of Susono; Takaaki Itou, Misima; Toshifumi Takaoka, Susono; Michihiro Ohashi, Misima; Koji Yokota, Nagoya, all of Japan

[73] Assignee: Toyota Jidosha Kabushiki Kaisha, Aichi, Japan

[21] Appl. No.: 590,714

[22] Filed: Jan. 24, 1996

[30] Foreign Application Priority Data

Jan. 27, 1995 [JP] Japan .................... 7-011903
Oct. 27, 1995 [JP] Japan .................... 7-280797

[51] Int. Cl.⁶ .................................. B01D 53/58
[52] U.S. Cl. ............ 423/237; 423/212; 423/213.5; 423/213.7; 423/235
[58] Field of Search ................... 423/212, 237, 423/213.5, 213.7, 235

[56] References Cited

U.S. PATENT DOCUMENTS

| | | | |
|---|---|---|---|
| 3,599,427 | 8/1971 | Jones et al. | 60/30 |
| 3,825,654 | 7/1974 | Kobylinski et al. | 423/213.7 |
| 5,120,695 | 6/1992 | Blumrich et al. | 502/78 |
| 5,292,991 | 3/1994 | Lachman et al. | 585/850 |
| 5,409,671 | 4/1995 | Takemoto et al. | 422/180 |
| 5,433,071 | 7/1995 | Willey et al. | 60/274 |

FOREIGN PATENT DOCUMENTS

| | | |
|---|---|---|
| A-0701858 | 3/1996 | European Pat. Off. |
| 49-71313 | 7/1974 | Japan |
| 51-149165 | 12/1976 | Japan |
| 52-4469 | 1/1977 | Japan |
| 53-86694 | 7/1978 | Japan |
| 53-86917 | 7/1978 | Japan |
| 60-143833 | 7/1985 | Japan |
| 63-236522 | 10/1988 | Japan |
| 4-265122 | 9/1992 | Japan |
| 4-365920 | 12/1992 | Japan |
| 6190246A | 7/1994 | Japan |

OTHER PUBLICATIONS

Takiguchi, M. et al., "Catalytic Engine" Nox Reduction of Diesel Engines with New Concept Onboard Ammonia Synthesis System SAE 920469, pp. 613–620. No date available.

*Primary Examiner*—Deborah Jones
*Attorney, Agent, or Firm*—Kenyon & Kenyon

[57] ABSTRACT

The method for purifying combustion exhaust gas according to the present invention utilizes a $NH_3$ decomposing catalyst. The $NH_3$ decomposing catalyst in the present invention is capable of converting substantially all of the $NH_3$ in the combustion exhaust gas to $N_2$ when the air-fuel ratio of the exhaust gas is lean and the temperature of the catalyst is within a predetermined optimum temperature range. Further, when the exhaust gas contains $NO_x$ in addition to $NH_3$, the $NH_3$ decomposing catalyst is capable of reducing the $NO_x$ in the optimum temperature range even though the air-fuel ratio of the exhaust gas is lean. In the present invention, the conditions of the exhaust gas containing $NO_x$ are adjusted before it is fed to the $NH_3$ decomposing catalyst in such a manner that the temperature of the exhaust gas is within the optimum temperature range and the air-fuel ratio of the exhaust gas is lean. Further, $NH_3$ is added to the exhaust gas before it is fed to the $NH_3$ decomposing catalyst. Therefore, a lean air-fuel ratio exhaust gas, at a temperature within the optimum temperature range, which contains both the $NO_x$ and $NH_3$ is fed to the $NH_3$ decomposing catalyst, and the $NO_x$, as well as the $NH_3$, in the exhaust gas is completely resolved by the $NH_3$ decomposing catalyst.

13 Claims, 5 Drawing Sheets

METHOD FOR PURIFYING COMBUSTION EXHAUST GAS

BACKGROUND OF THE INVENTION

1. Field of the Invention

The present invention relates to a process for purifying combustion exhaust gas and a device used in the process. More specifically, the present invention relates to a process which is capable of effectively resolving HC, CO and $NO_x$ components, as well as an $NH_3$ component, in the combustion exhaust gas such as the exhaust gas from internal combustion engines, boilers and furnaces, and a device suitable for performing that process (in this specification, the term $NO_x$ means any nitrogen oxide such as NO, $NO_2$, $N_2O$ and $N_3O_4$, further, the term "resolving" means removing components in the exhaust gas, for example, by converting the components to other components by chemical reactions).

2. Description of the Related Art

A process for resolving three pollutants in a combustion exhaust gas, i.e., a hydrocarbon component (HC), a carbon-monoxide component (CO), and nitrogen-oxide components ($NO_x$), simultaneously is disclosed in, for example, Japanese Unexamined Patent Publication No. 53-86917. In the process disclosed in the '917 publication, the exhaust gas from an internal combustion engine is fed to a three-way reducing and oxidizing catalyst at an air-fuel ratio lower than the stoichiometric air-fuel ratio (i.e., a rich air-fuel ratio) and, after it passes through the three-way reducing and oxidizing catalyst, secondary air is added to the exhaust gas so that the air-fuel ratio of the exhaust gas becomes higher than the stoichiometric air-fuel ratio (i.e., a lean air-fuel ratio). Then, the exhaust gas of the lean air-fuel ratio is fed to an oxidizing catalyst. Namely, in the process disclosed in '917 publication, the combustion exhaust gas from the engine is first fed to a three-way reducing and oxidizing catalyst in a reducing atmosphere, and after it passes through the three-way reducing and oxidizing catalyst, the atmosphere of the exhaust gas is changed to an oxidizing atmosphere. Then, this exhaust gas with an oxidizing atmosphere is fed to an oxidizing catalyst.

As is well known in the art, a three-way reducing and oxidizing catalyst is capable of simultaneously oxidizing HC and CO components and reducing $NO_x$ components in the exhaust gas when the air-fuel ratio of the exhaust gas is in a narrow air-fuel ratio range around the stoichiometric air-fuel ratio. However, when the air-fuel ratio of the exhaust gas is on the lean air-fuel ratio side compared to the above air-fuel ratio range (i.e., in an oxidizing atmosphere), the ability of the three-way reducing and oxidizing catalyst for reducing $NO_x$ components falls rapidly. Further, when the air-fuel ratio of the exhaust gas is on a rich side compared to the above optimum range (i.e., in a reducing atmosphere), the ability of the three-way reducing and oxidizing catalyst for oxidizing HC and CO components falls rapidly. Therefore, when a three-way reducing and oxidizing catalyst is used for resolving HC, CO and $NO_x$ components at the same time, it is necessary to control the engine so that the engine is always operated at an air-fuel ratio in the narrow air-fuel ratio range around the stoichiometric air-fuel ratio. In the actual operation of the engine, it is very difficult to maintain the operating air-fuel ratio of the engine strictly in such a narrow range in all operating conditions, and in some cases, emission of these components increases when the air-fuel ratio of the exhaust gas deviates from the optimum air-fuel ratio range.

In order to solve this problem, the internal combustion engine is operated at an air-fuel ratio lower than the stoichiometric air-fuel ratio in the process disclosed in the '917 publication and the air-fuel ratio of the exhaust gas is maintained on a rich side compared to the stoichiometric air-fuel ratio regardless of the change in the operating conditions of the engine. This rich air-fuel ratio exhaust gas is fed to the three-way reducing and oxidizing catalyst. Since the ability of the three-way reducing and oxidizing catalyst for reducing $NO_x$ components is high when the air-fuel ratio of the exhaust gas is rich, almost all of the $NO_x$ components in the exhaust gas are reduced by the reducing and oxidizing catalyst. Further, a portion of HC, CO components in the exhaust gas are oxidized by the reducing and oxidizing catalyst. After it passes through the three-way reducing and oxidizing catalyst, secondary air is supplied to the exhaust gas to adjust the air-fuel ratio of the exhaust gas so that the air-fuel ratio of the exhaust gas becomes lean, and this lean air-fuel ratio exhaust gas is, then fed to the oxidizing catalyst. Therefore, the portions of HC, CO components in the exhaust gas which are not oxidized by the three-way reducing and oxidizing catalyst are oxidized by the oxidizing catalyst in an oxidizing atmosphere.

According to the process in the '917 publication, $NO_x$ components and part of the HC, CO components are resolved by contacting the exhaust gas from the engine with the three-way reducing and oxidizing catalyst in a reducing atmosphere, and the remaining portion of the HC, CO components are resolved by contacting the exhaust gas in an oxidizing atmosphere with the oxidizing catalyst after it has passed through the three-way reducing and oxidizing catalyst. Since the air-fuel ratio of the exhaust gas from the engine is adjusted so that the air-fuel ratio becomes rich (a reducing atmosphere), then lean (an oxidizing atmosphere) in the process in the '917 publication, i.e., it is not required to maintain the air-fuel ratio of the exhaust gas in the narrow optimum range, HC, CO and $NO_x$ components in the exhaust gas can be resolved at high efficiency regardless of the operating condition of the engine.

However, one problem arises when the process in the '917 publication is used for resolving HC, CO and $NO_x$ components. The three-way reducing and oxidizing catalyst, though it has a high ability for reducing $NO_x$ components in a reducing atmosphere, also converts a portion of $NO_x$ components in the exhaust gas to $NH_3$ component (ammonia) in a reducing atmosphere. In the process in the '917 publication, since the rich air-fuel ratio exhaust gas is fed to the three-way reducing and oxidizing catalyst, the exhaust gas which flows out from the three-way reducing and oxidizing catalyst contains a small amount of $NH_3$. This $NH_3$ in the exhaust gas is oxidized and again produces $NO_x$ when the exhaust gas is fed to the oxidizing catalyst in an oxidizing atmosphere. Therefore, when the process in the '917 publication is used, it is difficult to resolve $NO_x$ components in the exhaust gas completely, since $NO_x$ components are produced by the oxidizing catalyst.

SUMMARY OF THE INVENTION

In view of the problems in the related art, the object of the present invention is to provide a process and a device for purifying a combustion exhaust gas which is capable of resolving substantially all of the HC, CO, and $NO_x$ components as well as a $NH_3$ component in the exhaust gas while preventing $NO_x$ from being produced by the oxidation of $NH_3$ contained in the exhaust gas.

The above object is achieved by a process for resolving $NH_3$ in a combustion exhaust gas by contacting a combustion exhaust gas containing $NH_3$ in an oxidizing atmosphere at a temperature within a predetermined range to an $NH_3$ decomposing catalyst which resolves $NH_3$ in an exhaust gas in an oxidizing atmosphere when the temperature of the catalyst is in the predetermined temperature range, converts $NH_3$ in the exhaust gas in an oxidizing atmosphere to $NO_x$ components when the temperature of the catalyst is higher than the predetermined temperature range, and allows $NH_3$ in the exhaust gas in an oxidizing atmosphere to pass through the catalyst when the temperature of the catalyst is lower than the predetermined temperature range.

The $NH_3$ decomposing catalyst is capable of resolving $NH_3$ in the exhaust gas in an oxidizing atmosphere when the temperature of the catalyst is within the predetermined temperature range. Therefore, by feeding the exhaust gas containing $NH_3$ to the $NH_3$ decomposing catalyst in an oxidizing atmosphere and at a temperature within the predetermined range, substantially all of $NH_3$ in the exhaust gas is resolved by the $NH_3$ decomposing catalyst without forming $NO_x$ components.

According to another aspect of the present invention, there is provided a process for resolving pollutants in the exhaust gas of an internal combustion engine comprising, contacting an exhaust gas of an internal combustion engine in a reducing atmosphere with an $NH_3$ synthesizing catalyst which converts $NO_x$ components in the exhaust gas, in a reducing atmosphere, to $NH_3$, adjusting the conditions of the exhaust gas after it contacts the $NH_3$ synthesizing catalyst so that the exhaust gas is in an oxidizing atmosphere and within a predetermined temperature range, and contacting the exhaust gas, after its atmosphere and temperature are adjusted, with an $NH_3$ decomposing catalyst which resolves $NH_3$ in the exhaust gas in an oxidizing atmosphere when the temperature of the catalyst is in a predetermined temperature range, converts $NH_3$ in the exhaust gas in an oxidizing atmosphere to $NO_x$ components when the temperature of the catalyst is higher than the predetermined temperature range, and allows $NH_3$ in the exhaust gas in an oxidizing atmosphere to pass through the catalyst when the temperature of the catalyst is lower than the predetermined temperature range.

In this aspect of the invention, the exhaust gas from the internal combustion engine contacts the $NH_3$ synthesizing catalyst in a reducing atmosphere. Therefore, the $NO_x$ component in the exhaust gas is converted to $NH_3$. Further, after it contacts the $NH_3$ synthesizing catalyst, the exhaust gas contacts the $NH_3$ decomposing catalyst in an oxidizing atmosphere and at the temperature within the predetermined temperature range. Thus, substantially all of $NH_3$ produced by the $NH_3$ synthesizing catalyst is resolved by the $NH_3$ decomposing catalyst, and the exhaust gas flowing out from the $NH_3$ decomposing catalyst is completely free from the $NO_x$ and $NH_3$.

Further, the $NH_3$ synthesizing catalyst in the present invention is capable of resolving most of pollutants in the exhaust gas when the exhaust gas is in a reducing atmosphere (i.e., when the oxygen concentration in the exhaust gas is low). For example, the pollutants such as HC, CO and NO in the exhaust gas are resolved by the $NH_3$ synthesizing catalyst by the following reactions when the exhaust gas is in a reducing atmosphere.

$$(CH_2)_m + (3m/2)O_2 \rightarrow mCO_2 + mH_2O \qquad (1)$$

$$CO + (1/2)O_2 \rightarrow CO_2 \qquad (2)$$

$$NO + CO \rightarrow (1/2)N_2 + CO_2 \qquad (3)$$

However, since the oxygen concentration is low when the exhaust gas is in a reducing atmosphere, a portion of CO and HC in the exhaust gas is not resolved by the above reactions (1) and (2), and a small amount of CO and HC are resolved by the following reactions.

$$(CH_2)_n + (n/2)O_2 \rightarrow nCO + nH_2 \qquad (4)$$

$$(CH_2)_n + nH_2O \rightarrow nCO + 2nH_2 \qquad (5)$$

$$CO + H_2O \rightarrow CO_2 + H_2 \qquad (6)$$

When $H_2$ is formed by the reactions (4) through (6), NO in the exhaust gas reacts $H_2$ and a small amount of $NH_3$ is formed by the following reaction.

$$NO + (5/2)H_2 \rightarrow NH_3 + H_2O$$

The speed of the reactions (4) through (6) are slow compared with the reactions (1) through (3), and when the oxygen concentration of the exhaust gas is low (for example, the excess air ratio λ of the exhaust gas is lower than 0.95), the reactions (4) through (6) are not likely to occur, and in this case CO and HC pass through the $NH_3$ synthesizing catalyst without being resolved. Therefore, to produce $NH_3$ by the $NH_3$ synthesizing catalyst, the excess air ratio λ of the exhaust gas must be slightly lower than 1.0, for example, the value of λ must be λ=0.95 to 1.0 and preferably between 0.98 and 1.0.

According to another aspect of the present invention, there is provided a device for resolving $NH_3$ contained in the exhaust gas of an internal combustion engine comprising an $NH_3$ decomposing catalyst disposed on an exhaust gas passage of an internal combustion engine, wherein the $NH_3$ decomposing catalyst resolves $NH_3$ in an exhaust gas flowing into the catalyst in an oxidizing atmosphere when the temperature of the catalyst is in a predetermined temperature range, converts $NH_3$ in the exhaust gas flowing into the catalyst in an oxidizing atmosphere to $NO_x$ components when the temperature of the catalyst is higher than the predetermined temperature range, and allows $NH_3$ in an exhaust gas in an oxidizing atmosphere to pass through the catalyst when the temperature of the catalyst is lower than the predetermined temperature range, oxygen supply means for supplying oxygen to the exhaust gas flowing into the $NH_3$ decomposing catalyst so that the exhaust gas flowing into the $NH_3$ decomposing catalyst becomes an oxidizing atmosphere, and a temperature maintaining means for maintaining the temperature of the exhaust gas flowing into the $NH_3$ decomposing catalyst within the predetermined temperature range regardless of change in the temperature of the exhaust gas discharged from the internal combustion engine.

In this aspect of the invention, the oxygen supply means adjust the conditions of the exhaust gas so that the exhaust gas becomes an oxidizing atmosphere, and the temperature maintaining means maintains the temperature of the exhaust gas within the predetermined temperature range. Thus, an exhaust gas is fed to the $NH_3$ decomposing catalyst in an oxidizing atmosphere and at the temperature within the predetermined temperature, and $NH_3$ in the exhaust gas is resolved by the $NH_3$ decomposing catalyst.

According to another aspect of the invention, there is provided a device for resolving $NH_3$ contained in the exhaust gas of an internal combustion engine comprising a plurality of $NH_3$ decomposing catalysts disposed on the exhaust gas passage in series arrangement wherein each of the $NH_3$ decomposing catalysts resolves $NH_3$ in the exhaust gas flowing into the catalyst in an oxidizing atmosphere when the temperature of the catalyst is in a predetermined temperature range, converts $NH_3$ in the exhaust gas flowing into the catalyst in an oxidizing atmosphere to $NO_x$ components when the temperature of the catalyst is higher than the predetermined temperature range, and allows $NH_3$ in an exhaust gas in an oxidizing atmosphere to pass through the catalyst when the temperature of the catalyst is lower than the predetermined temperature range, oxygen supply means for supplying oxygen selectively to the exhaust gas flowing into the respective $NH_3$ decomposing catalysts, temperature detecting means for detecting the temperature of the respective $NH_3$ decomposing catalysts, and selecting means for controlling the oxygen supply means in such a manner that the oxygen supply means supplies oxygen to the exhaust gas flowing into the $NH_3$ decomposing catalyst(s) whose temperature is within the predetermined temperature range.

In this aspect of the invention, more than one $NH_3$ decomposing catalyst is disposed on the exhaust gas passage of the engine in a series arrangement. Since the temperature of the exhaust gas from the engine becomes low as the exhaust gas flows down the exhaust gas passage due to the heat dissipation through the wall of the exhaust gas passage, the temperatures of the exhaust gas flowing into the respective $NH_3$ decomposing catalyst are different from each other according to the location of the catalyst. Consequently, the temperatures of the $NH_3$ decomposing catalysts are also different from each other. The selecting means selects the $NH_3$ decomposing catalyst, which has a temperature within the predetermined range, and controls the oxygen supply means so that oxygen is supplied to the $NH_3$ decomposing catalyst having a temperature within the predetermined range. Therefore, the exhaust gas in an oxidizing atmosphere is supplied to the $NH_3$ decomposing catalyst at a temperature within the predetermined temperature range, and $NH_3$ in the exhaust gas is effectively resolved by the $NH_3$ decomposing catalyst even if the temperature of the exhaust gas at the outlet of the engine changes due to a change in the operating condition of the engine.

According to another aspect of the present invention, there is provided a process for resolving $NO_x$ in a combustion exhaust gas using an $NH_3$ decomposing catalyst which resolves $NO_x$ in the exhaust gas in an oxidizing atmosphere under the presence of an $NH_3$ when the temperature of the catalyst is within a predetermined temperature range, converts the $NH_3$ in the exhaust gas in an oxidizing atmosphere when the temperature of the catalyst is higher than the predetermined temperature range, and allows the $NH_3$ in the exhaust gas in an oxidizing atmosphere to pass through the catalyst when the temperature of the catalyst is lower than the predetermined temperature range comprising, supplying $NH_3$ to an exhaust gas from an internal combustion engine, and contacting the exhaust gas to the $NH_3$ decomposing catalyst in an oxidizing atmosphere and at the temperature within the predetermined temperature range.

In this aspect of the invention, the $NH_3$ decomposing catalyst resolves the $NO_x$ by reacting a $NH_3$ with $NO_x$ components in the exhaust gas in an oxidizing atmosphere when the temperature is within a predetermined temperature range. Since $NH_3$ is added to the exhaust gas before the exhaust gas is fed to the $NH_3$ decomposing catalyst in this aspect of the invention, the exhaust gas flowing into the $NH_3$ decomposing catalyst in oxidizing atmosphere and at the temperature within the predetermined temperature range contains $NO_x$ and $NH_3$, the $NO_x$ in the exhaust gas react with the $NH_3$ on the $NH_3$ decomposing catalyst and are resolved.

According to another aspect of the present invention, there is provided a device for resolving $NO_x$ in the exhaust gas of an internal combustion engine operated at an air-fuel ratio higher than the stoichiometric air-fuel ratio comprising an $NH_3$ decomposing catalyst disposed on an exhaust gas passage of an internal combustion engine, wherein the $NH_3$ decomposing catalyst resolves $NO_x$ in the exhaust gas flowing into the catalyst in an oxidizing atmosphere under the presence of an $NH_3$ when the temperature of the catalyst is in a predetermined temperature range, converts the $NH_3$ in the exhaust gas flowing into the catalyst in an oxidizing atmosphere to $NO_x$ when the temperature of the catalyst is higher than the predetermined temperature range, and allows the $NH_3$ in the exhaust gas in an oxidizing atmosphere to pass through the catalyst when the temperature of the catalyst is lower than the predetermined temperature range, an $NH_3$ supply means for supplying $NH_3$ to the exhaust gas flowing into the $NH_3$ decomposing catalyst, and temperature maintaining means for maintaining the temperature of the exhaust gas flowing into the $NH_3$ decomposing catalyst within the predetermined temperature range regardless of change in the temperature of the exhaust gas discharged from the internal combustion engine.

In this aspect of the invention, the internal combustion engine is operated at a lean air-fuel ratio and the exhaust gas from the engine is in an oxidizing atmosphere. $NH_3$ is added to this exhaust gas before the exhaust gas flows into the $NH_3$ decomposing catalyst. Further, the temperature of the exhaust gas is maintained within the predetermined range. Therefore, the exhaust gas containing $NO_x$ and a $NH_3$ is fed to the $NH_3$ decomposing catalyst in an oxidizing atmosphere and at the temperature within the predetermined temperature range, and the $NO_x$ in the exhaust gas reacts the $NH_3$ component at the $NH_3$ decomposing catalyst and resolved.

According to another aspect of the present invention, there is provided a device for resolving $NO_x$ in an exhaust gas of an internal combustion engine operated at an air-fuel ratio higher than the stoichiometric air-fuel ratio comprising a plurality of $NH_3$ decomposing catalysts disposed on the exhaust gas passage in series arrangement wherein each of the $NH_3$ decomposing catalysts resolves $NO_x$ in the exhaust gas flowing into the catalyst in an oxidizing atmosphere under the presence of an $NH_3$ when the temperature of the catalyst is in a predetermined temperature range, converts the $NH_3$ in the exhaust gas flowing into the catalyst in an oxidizing atmosphere to $NO_x$ when the temperature of the catalyst is higher than the predetermined temperature range, and allows the $NH_3$ in the exhaust gas in an oxidizing atmosphere to pass through the catalyst when the temperature of the catalyst is lower than the predetermined temperature range, an $NH_3$ supply means for supplying $NH_3$ selectively to the exhaust gas flowing into the respective $NH_3$ decomposing catalysts, temperature detecting means for detecting the temperature of the respective $NH_3$ decomposing catalysts, and selecting means for controlling the $NH_3$ supply means in such a manner that the $NH_3$ supply means supplies $NH_3$ to the exhaust gas flowing into the $NH_3$ decomposing catalysts whose temperature is within the predetermined temperature range.

In this aspect of the invention, more than one $NH_3$ decomposing catalysts are disposed on the exhaust gas passage of the engine. Since the temperature of the exhaust gas becomes lower as the exhaust gas flows down the exhaust gas passage, the temperatures of the respective $NH_3$ decomposing catalysts vary in accordance with the location of the $NH_3$ decomposing catalysts. Therefore, even when the temperature of the exhaust gas changes due to change in the operating condition of the engine, some of the $NH_3$ decomposing catalysts always stay in the predetermined temperature range. A selecting means controls the $NH_3$ supply means so that $NH_3$ is supplied to the exhaust gas flowing into the $NH_3$ decomposing catalysts which has a temperature within the predetermined range. Therefore, exhaust gas in an oxidizing atmosphere containing $NH_3$ and $NO_x$ is fed to the $NH_3$ decomposing catalyst which has the temperature within the predetermined range. Consequently, the $NO_x$ in the exhaust gas reacts the $NH_3$ at the $NH_3$ decomposing catalyst and resolved.

According to another aspect of the present invention, there is provided a device for resolving $NO_x$ components in an exhaust gas of an internal combustion engine, the operating air-fuel ratio of the engine fluctuates around the stoichiometric air-fuel ratio in such a manner that the average operating air-fuel ratio of the engine is higher than the stoichiometric air-fuel ratio, the device comprises an $NH_3$ synthesizing catalyst disposed on an exhaust gas passage of the engine, wherein the $NH_3$ synthesizing catalyst converts $NO_x$ in the exhaust gas discharged from the engine when the operating air-fuel ratio of the engine is lower than the stoichiometric air-fuel ratio to $NH_3$ and $N_2$, and an $NH_3$ decomposing catalyst disposed on the exhaust gas passage downstream of the $NH_3$ synthesizing catalyst, wherein the $NH_3$ decomposing catalyst adsorbs the $NH_3$ produced by the $NH_3$ synthesizing catalyst when the engine operating air-fuel ratio is lower than the stoichiometric air-fuel ratio and wherein the $NH_3$ decomposing catalyst reduces $NO_x$ in the exhaust gas discharged from the engine and pass through the $NH_3$ synthesizing catalyst when the operating air-fuel ratio of the engine is higher than the stoichiometric air-fuel ratio by reacting the $NO_x$ with the $NH_3$ component adsorbed in the $NH_3$ decomposing catalyst.

In this aspect of the invention, the operating air-fuel ratio of the engine fluctuates around the stoichiometric air-fuel ratio. When the engine operating air-fuel ratio is lower than the stoichiometric air-fuel ratio (i.e., rich air-fuel ratio), the $NO_x$ producing catalyst converts the $NO_x$ discharged from the engine to $NH_3$ and $N_2$. This $NH_3$ component is absorbed by the $NH_3$ decomposing catalyst disposed at downstream of the $NH_3$ synthesizing catalyst. Therefore, $NH_3$ is not discharged to atmosphere. When the engine operating air-fuel ratio becomes higher than the stoichiometric air-fuel ratio (i.e., lean air-fuel ratio), the $NO_x$ discharged from the engine pass through the $NH_3$ synthesizing catalyst without being converted to $NH_3$ and $N_2$. However, the $NO_x$ pass through the $NH_3$ synthesizing catalyst is reduced at the $NH_3$ decomposing catalyst by reacting the $NH_3$ absorbed by the $NH_3$ decomposing catalyst. Therefore, both the $NO_x$ and $NH_3$ are not discharged to atmosphere.

According to another aspect of the present invention, there is provided a device for resolving $NO_x$ in an exhaust gas of an internal combustion engine, the operating air-fuel ratio of the engine fluctuates around the stoichiometric air-fuel ratio in such a manner that the average operating air-fuel ratio of the engine is higher than the stoichiometric air-fuel ratio, the device comprises an $NH_3$ synthesizing catalyst disposed on an exhaust gas passage of the engine, wherein the $NH_3$ synthesizing catalyst converts $NO_x$ in the exhaust gas discharged from the engine when the operating air-fuel ratio of the engine is lower than the stoichiometric air-fuel ratio to $NH_3$ and $N_2$, an $NO_x$ absorbent disposed on the exhaust gas passage downstream of the $NH_3$ synthesizing catalyst, wherein the $NO_x$ absorbent absorbs $NO_x$ in the exhaust gas discharged from the engine and pass through the $NH_3$ synthesizing catalyst when the operating air-fuel ratio of the engine is higher than the stoichiometric air-fuel ratio and releases the absorbed $NO_x$ when the engine operating air-fuel ratio becomes lower than the stoichiometric air-fuel ratio, and an $NH_3$ decomposing catalyst disposed on the exhaust gas passage downstream of the $NO_x$ absorbent, wherein, when the engine operating air-fuel ratio is lower than the stoichiometric air-fuel ratio, the $NH_3$ decomposing catalyst reduces the $NO_x$ released from the $NO_x$ absorbent by reacting the $NO_x$ with the $NH_3$ produced by the $NH_3$ synthesizing catalyst.

In this aspect of the invention, the $NO_x$ discharged from the engine when the engine operating air-fuel ratio is higher than the stoichiometric air-fuel ratio are absorbed by the $NO_x$ absorbent. Therefore, the $NO_x$ are not discharged to atmosphere when the engine operating air-fuel ratio is higher than the stoichiometric air-fuel ratio. When the engine operating air-fuel ratio becomes lower than the stoichiometric air-fuel ratio, the $NO_x$ absorbed by the $NO_x$ absorbent are released from the $NO_x$ absorbent. However, the $NH_3$ synthesizing catalyst converts the $NO_x$ discharged from the engine to $NH_3$ and $N_2$ when the engine operating air-fuel ratio becomes lower than the stoichiometric air-fuel ratio. Therefore, the $NO_x$ released from the $NO_x$ absorbent and the $NH_3$ produced by the $NH_3$ synthesizing catalyst flows into the $NH_3$ decomposing catalyst at the same time. These $NO_x$ and $NH_3$ react each other and form $N_2$ and $H_2O$. Thus, both the $NO_x$ and $NH_3$ components are not discharged to atmosphere.

According to another aspect of the present invention, there is provided a device for resolving $NO_x$ in an exhaust gas of an internal combustion engine, the operating air-fuel ratio of the engine fluctuates around the stoichiometric air-fuel ratio in such a manner that the average operating air-fuel ratio of the engine is higher than the stoichiometric air-fuel ratio, the device comprising an $NH_3$ synthesizing catalyst disposed on an exhaust gas passage of the engine, wherein the $NH_3$ synthesizing catalyst converts $NO_x$ in the exhaust gas discharged from the engine when the operating air-fuel ratio of the engine is lower than the stoichiometric air-fuel ratio of $NH_3$ and $N_2$, an $NH_3$ decomposing catalyst disposed on the exhaust gas passage downstream of the $NH_3$ synthesizing catalyst, wherein the $NH_3$ decomposing catalyst absorbs $NO_x$ in the exhaust gas discharged from the engine and pass through the $NH_3$ synthesizing catalyst when the operating air-fuel ratio of the engine is higher than the stoichiometric air-fuel ratio and wherein the $NH_3$ decomposing catalyst reduces the absorbed $NO_x$ by reacting the $NO_x$ with the $NH_3$ produced by the $NH_3$ synthesizing catalyst when the engine operating air-fuel ratio is lower than the stoichiometric air-fuel ratio.

In this aspect of the invention, the $NH_3$ decomposing catalyst is also capable of absorbing the $NO_x$ in the exhaust gas flowing into the $NH_3$ decomposing catalyst when the engine operating air-fuel ratio is higher than the stoichiometric air-fuel ratio. Thus, the $NO_x$ are not discharged to atmosphere when the engine operating air-fuel ratio is higher than the stoichiometric air-fuel ratio. When the engine operating air-fuel ratio becomes lower than the stoichiometric air-fuel ratio, a $NH_3$ is produced by the $NH_3$ synthesizing catalyst upstream of the $NH_3$ decomposing catalyst. However, this $NH_3$ is oxidized at the $NH_3$ decomposing catalyst by reacting the $NO_x$ absorbed by the $NH_3$ decomposing catalyst. Therefore, both the $NO_x$ and $NH_3$ are not discharged to atmosphere when the engine operating air-fuel ratio becomes lower than the stoichiometric air-fuel ratio.

BRIEF DESCRIPTION OF THE DRAWINGS

The present invention will be better understood from the description, as set forth hereinafter with reference to the accompanying drawings in which.

DESCRIPTION OF THE PREFERRED EMBODIMENT

In the embodiments explained hereinafter, $NH_3$ decomposing catalysts are used for resolving $NO_x$ and $NH_3$ from a combustion exhaust gas. Therefore, an $NH_3$ decomposing catalyst is explained before explaining the respective embodiments.

The $NH_3$ decomposing catalyst in the embodiments of the present invention uses, for example, a honeycomb type substrate made of cordierite, and an alumina layer which act as a carrier for the catalyst is coated on the cell surface of the honeycomb substrate. On this carrier, at least-one substance selected from elements belong to the fourth period or the eighth group in the periodic table of elements, such as copper (Cu), chrome (Cr), vanadium (V), titanium (Ti), iron (Fe), nickel (Ni), cobalt (Co), platinum (Pt), palladium (Pd), rhodium (Rh) and iridium (Ir) are carried as a catalyst.

The $NH_3$ decomposing catalyst is capable of converting all the $NH_3$ component in the exhaust gas flowing into the $NH_3$ decomposing catalyst to the $N_2$ component provided that the exhaust gas is in an oxidizing atmosphere and the temperature of the catalyst is within a specific temperature range as determined by the substance being used as the catalyst. Therefore, when the exhaust gas is an oxidizing atmosphere containing a $NH_3$ component and flows through the $NH_3$ decomposing catalyst in this temperature range, the $NH_3$ component in the exhaust gas is almost completely resolved, and the exhaust gas flows out from the $NH_3$ decomposing catalyst contains no $NH_3$ component. In the explanation below, this temperature range in which the $NH_3$ decomposing catalyst can resolve all the $NH_3$ component in the exhaust gas is called an optimum temperature range.

When the temperature of the $NH_3$ decomposing catalyst is higher than the optimum temperature range, the $NH_3$ component in the exhaust gas flowing into the $NH_3$ decomposing catalyst is oxidized by the $NH_3$ decomposing catalyst and $NO_x$ components are produced.

Namely, when the temperature of the $NH_3$ decomposing catalyst is higher than the optimum temperature range, the oxidizing reaction of the $NH_3$ component, i.e., $4NH_3 + 7O_2 \rightarrow 4NO_2 + 6H_2O$, and/or $4NH_3 + 5O_2 \rightarrow 4NO + 6H_2O$ become dominant on the $NH_3$ decomposing catalyst, and the amount of $NO_x$ components (mainly NO and $NO_2$) in the exhaust gas flowing out from the $NH_3$ decomposing catalyst increases.

Further, when the temperature of the $NH_3$ decomposing catalyst is lower than the optimum temperature range, the oxidizing reaction of the $NH_3$ component becomes lower, and the amount of the $NH_3$ component in the exhaust gas flowing out from the $NH_3$ decomposing catalyst increases.

Figure 6:
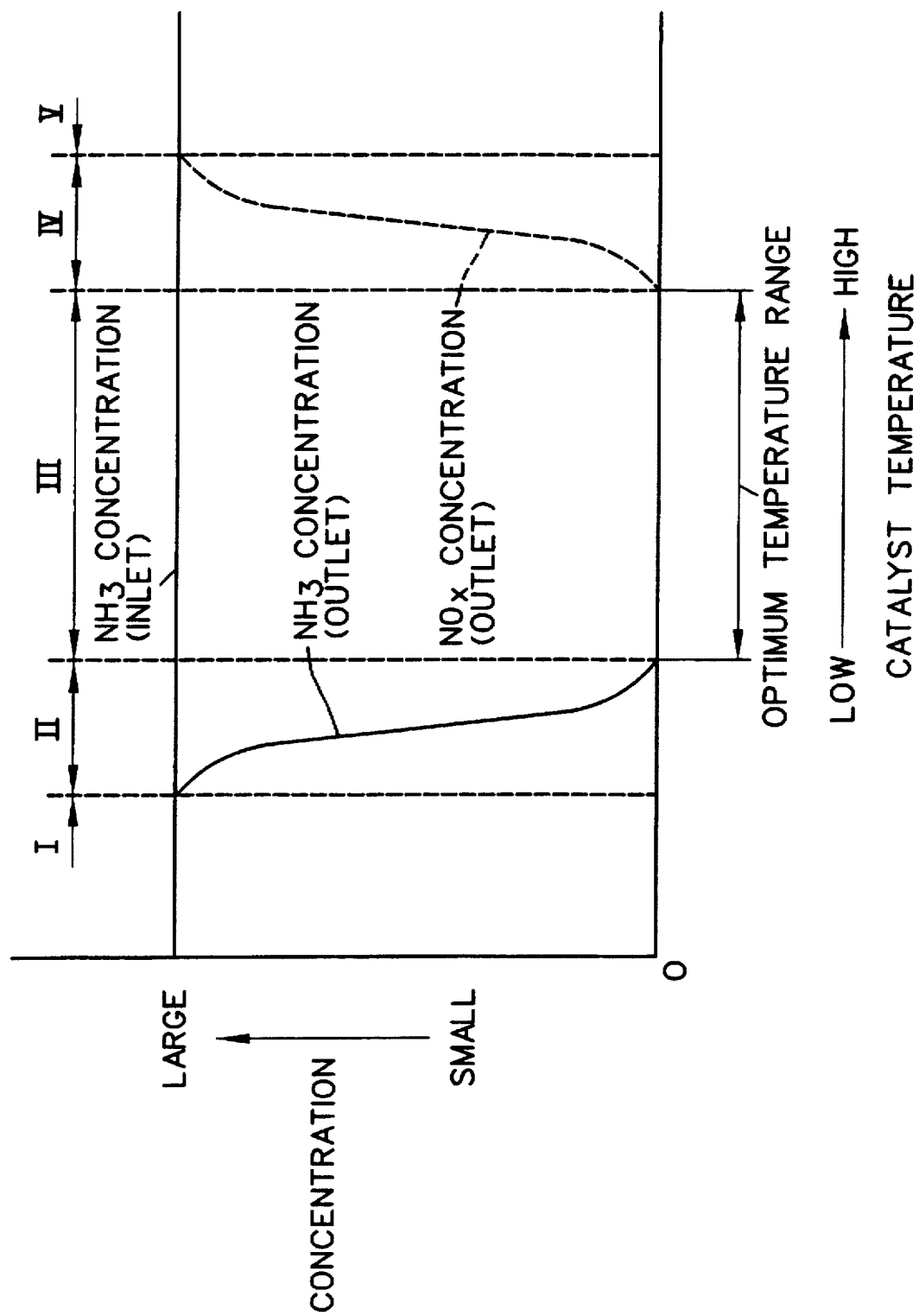
FIG. 6 is a drawing showing the change in the characteristics of an $NH_3$ decomposing catalyst in accordance with the change in the temperature.

FIG. 6 schematically illustrates the change in the characteristics of the $NH_3$ decomposing catalyst in accordance with the change in the temperature. FIG. 6 shows the change in the concentration of the $NH_3$ and $NO_x$ components in the exhaust gas flowing out from the $NH_3$ decomposing catalyst in accordance with the temperature of the $NH_3$ decomposing catalyst when the exhaust gas flowing into the $NH_3$ decomposing catalyst is in an oxidizing atmosphere and the concentration of $NH_3$ in the exhaust gas is maintained at a constant level. The vertical axis and the horizontal axis in FIG. 6 represent the concentration of the respective components in the exhaust gas and the temperature of the $NH_3$ decomposing catalyst, respectively. The solid line and the dotted line in FIG. 6 represent the concentrations of the $NH_3$ component and the $NO_x$ components in the exhaust gas flowing out from the $NH_3$ decomposing catalyst.

As shown in FIG. 6, provided that the concentration of the $NH_3$ component in the exhaust gas flowing into the $NH_3$ decomposing catalyst is maintained at a constant level, the concentration of the $NH_3$ component in the outflow exhaust gas is substantially the same as the concentration of $NH_3$ in the inflow exhaust gas in the low temperature region (region I, in FIG. 6). In this temperature region, the concentration of the $NO_x$ components in the outflow exhaust gas is substantially zero. This means that substantially all of the $NH_3$ component in the exhaust gas passes the $NH_3$ decomposing catalyst without reaction when the temperature is low (region I in FIG. 6).

When the temperature becomes higher than the above low temperature region, the concentration of the $NH_3$ component in the outflow exhaust gas decreases as the temperature increases, while the concentration of the $NO_x$ components is substantially the same (region II in FIG. 6). Namely, in this temperature region, the amount of $NH_3$ component in the exhaust gas which is converted to $N_2$ component increases as the temperature increases.

When the temperature further increases, as shown in region III in FIG. 6, the concentration of $NH_3$ component in the outflow exhaust gas further decreases and the concentration of both the $NH_3$ and $NO_x$ components becomes substantially zero. Namely, in this temperature region (region III in FIG. 6), all of the $NH_3$ component in the exhaust gas flowing into the $NH_3$ decomposing catalyst is resolved (i.e., converted to $N_2$ component) by $NH_3$ decomposing catalyst without forming $NO_x$ components.

However, when the temperature becomes higher than this region, the concentration of the $NO_x$ components in the outflow exhaust gas increases as the temperature increases (region IV in FIG. 6), and all of the $NH_3$ component in the exhaust gas is converted to $NO_x$ components by the $NH_3$ decomposing catalyst in a high temperature region (region V in FIG. 6).

In this specification, the optimum temperature range of the $NH_3$ decomposing catalyst is defined as a temperature range in which all of the $NH_3$ component in the exhaust gas is converted to $N_2$ component without forming any $NO_x$ component, i.e., such as the temperature range indicated by the temperature region III in FIG. 6.

The optimum temperature range of the $NH_3$ decomposing catalyst changes according the substance used as the catalytic component, and generally starts at a relatively low temperature compared with, for example, the activating temperature of the three-way reducing and oxidizing catalyst. For example, when a substance such as platinum (Pt), rhodium (Rh), or palladium (Pd) is used, the optimum temperature range is approximately 100° to 400° C. (preferably 100° to 300° C. and most preferably 100° to 250° C. in case of platinum (Pt), and preferably 150° to 400° C. and most preferably 150° C. to 300° C. in case of rhodium (Rh) or palladium (Pd)). When a substance such as copper (Cu), chrome (Cr), or iron (Fe) (for example) is used, the optimum temperature range is approximately 150° to 650° C. (more preferably, 150° to 500° C.). Therefore, if the $NH_3$ decomposing catalyst is formed as a tandem compound type catalyst using both types of the catalytic component, i.e., if the catalytic components such as platinum (Pt) are carried on the downstream part of the substrate and the catalytic components such as chrome (Cr) are carried on the upstream part of the substrate, the optimum temperature range of the $NH_3$ decomposing catalyst can be widened as a whole.

The reason why the $NH_3$ decomposing catalyst converts substantially all of the $NH_3$ component in the exhaust gas to the $N_2$ component without producing any $NO_x$ components only in the specific temperature range is not clear at present. However, it is considered that this phenomenon is due to the following reason.

When the temperature of the $NH_3$ decomposing catalyst is in the optimum temperature range, the following denitrating reactions occur in the $NH_3$ decomposing catalyst, in addition to the above mentioned oxidizing reactions $4NH_3 + 7O_2 \rightarrow 4NO_2 + 6H_2O$ and/or $4NH_3 + 5O_2 \rightarrow 4NO + 6H_2O$:

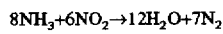

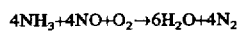

Due to these denitrating reactions, the $NO_x$ components produced by the oxidizing reactions are immediately converted to the $N_2$ component. Namely, in the optimum temperature range, a portion of the $NH_3$ in the exhaust gas flowing into the $NH_3$ decomposing catalyst is converted to $NO_x$ by the oxidizing reactions, and this $NO_x$ immediately reacts the remaining $NH_3$ in the exhaust gas and is converted to $N_2$ by the denitrating reactions. By these sequential reactions, substantially all of the $NH_3$ in the exhaust gas is converted to $N_2$ when the temperature of the catalyst is within the optimum temperature range.

When the temperature of the $NH_3$ decomposing catalyst is above the optimum temperature range, the oxidizing reactions become dominant in the catalyst and the portions of $NH_3$ which is oxidized by the catalyst increases. Thus, the denitrating reactions hardly occur in the catalyst due to the shortage of $NH_3$ component in the exhaust gas, and the $NO_x$ produced by the oxidizing reactions flows out from the $NH_3$ decomposing catalyst without being reduced by the denitrating reactions.

On the other hand, when the temperature of $NH_3$ decomposing catalyst is below the optimum temperature range, the oxidizing reactions hardly occur due to the low temperature. This causes the $NH_3$ in the exhaust gas passes through the $NH_3$ decomposing catalyst without being oxidized by the $NO_x$ due to the shortage of the $NO_x$ in the exhaust gas.

As explained above, the optimum temperature range of the $NH_3$ decomposing catalyst is a temperature range in which the oxidizing reactions of the $NH_3$ and the denitrating reactions of the $NO_x$ balance each other in such a manner that the $NO_x$ produced by the oxidation of the $NH_3$ immediately reacts with $NH_3$ in the exhaust gas without causing any surplus $NO_x$ and $NH_3$. Consequently, the optimum temperature range of the $NH_3$ decomposing catalyst is determined by the oxidizing ability of the catalyst and its temperature dependency. Therefore, when the catalyst component having high oxidizing ability, such as platinum (Pt), is used, the optimum temperature range becomes lower than that when the catalyst component having relatively low oxidizing ability, such as chrome (Cr) is used.

As explained above, though the mechanism of the phenomenon is not completely clarified, the $NH_3$ decomposing catalyst actually converts all of the $NH_3$ in the exhaust gas in an oxidizing atmosphere when the temperature is within the optimum temperature range. Further, when the $NH_3$ decomposing catalyst is used in the optimum temperature range the following facts were found in connection with the above phenomenon:

(a) When the exhaust gas flowing into the $NH_3$ decomposing catalyst is in an oxidizing atmosphere, i.e., when the air-fuel ratio of the exhaust gas is lean compared to the stoichiometric air-fuel ratio, substantially all of the $NH_3$ in the exhaust gas is converted to $N_2$ without producing any $NO_x$. This occurs when the exhaust gas is in an oxidizing atmosphere (a lean air-fuel ratio), but regardless of the degree of leanness of air-fuel ratio of the exhaust gas. (In this specification, an air-fuel ratio of the exhaust gas at a certain point is defined by a ratio of the air and the fuel which are supplied to the combustion chambers or exhaust passages upstream of the point. Therefore, when no air or fuel is supplied in the exhaust passages upstream of the considered point, the air-fuel ratio of the exhaust gas at the point becomes the same as the air-fuel ratio of the air-fuel mixture supplied to the combustion chambers).

(b) When the exhaust gas flowing into the $NH_3$ decomposing catalyst contains $NO_x$ in addition to $NH_3$, all of the $NO_x$ in the exhaust gas as well as the $NH_3$ is converted to $N_2$, and the concentration of the $NO_x$ components in the exhaust gas becomes zero. In this case, the ratio of the concentrations of the $NO_x$ components and the $NH_3$ component is not necessarily stoichiometrical for the denitrating reactions (i.e., 4:3, or 1:1). It is only required that the exhaust gas contains an amount of $NH_3$ more than the amount required for reducing the $NO_x$ ($NO_2$ and $NO$) in the exhaust gas. As explained above, since the surplus $NH_3$ in the exhaust gas is all converted to $N_2$ when the exhaust gas is in an oxidizing atmosphere, no surplus $NH_3$ is contained in the exhaust gas flowing out from the $NH_3$ decomposing catalyst even in this case.

(c) When the exhaust gas flowing into the $NH_3$ decomposing catalyst contains HC and CO components, all of the HC and CO components are oxidized by the $NH_3$ decomposing catalyst, provided that the air-fuel ratio of the exhaust gas is lean compared to the stoichiometric air-fuel ratio, and no HC and CO components are contained in the exhaust gas flowing out from the $NH_3$ decomposing catalyst.

However, when the exhaust gas flowing into the $NH_3$ decomposing catalyst contains both the $NH_3$ and $NO_x$, it was found that the temperature region IV in FIG. 6, i.e., the temperature region in which the concentration of $NO_x$ components in the outflow exhaust gas increases as the temperature of the catalyst increases, moves to the lower temperature side compared to that when the exhaust gas flowing into the $NH_3$ decomposing catalyst contains only the $NH_3$ components. This is because, when the exhaust gas contains $NO_x$ in addition to $NH_3$, the $NO_x$ in the inflow exhaust gas in addition to the $NO_x$ produced by the oxidizing reaction of $NH_3$ must be reduced by the $NH_3$ in the exhaust gas. Consequently, the shortage of the $NH_3$ is apt to occur in the relatively low temperature region. Therefore, when the exhaust gas contains both the $NH_3$ and the $NO_x$, the optimum temperature range of the $NH_3$ decomposing catalyst becomes narrower.

In relation to above (b), a conventional denitrating catalyst, such as a vanadia-titania ($V_2O_5$-$TiO_2$) type catalyst also has a capability for resolving $NH_3$ and $NO_x$ in the exhaust gas under a certain conditions. However, in case of the conventional denitrating catalyst, the amounts of $NH_3$ and $NO_x$ components must be strictly stoichiometrical in order to react $NH_3$ with $NO_x$ without causing any surplus $NH_3$ and $NO_x$. Namely, when both the $NO_2$ and NO are contained in the exhaust gas, the amount (moles) of the $NH_3$ in the exhaust gas must be strictly equal to the total of the moles of $NO_2$ in the exhaust gas multiplied by ¾ and the moles of NO in the exhaust gas in order to react $NH_3$ and $NO_x$ without causing any surplus $NH_3$ and $NO_x$. However, in case of the $NH_3$ decomposing catalyst in the embodiments of the present invention, if the amount of the $NH_3$ is more than the stoichiometrical compared to the amount of $NO_x$, and if the air-fuel ratio of the exhaust gas is lean, all of the $NH_3$ and $NO_x$ are converted to $N_2$ without causing any surplus $NH_3$ and $NO_x$. This is an important difference between the $NH_3$ decomposing catalyst in the present invention and the conventional denitrating catalyst.

As explained in FIG. 6, though the $NH_3$ decomposing catalyst converts all of the $NH_3$ in the exhaust gas in the optimum temperature range, some $NH_3$ passes through when the temperature is below the optimum temperature range. In order to prevent this outflow of $NH_3$ in the low temperature region, an acidic inorganic substance may be used. It is known in the art that an acidic inorganic substance (which includes Broensted acids such as zeolite, silica ($SiO_2$), silica-alumina ($SiO_2$-$Al_2O_3$), and titania ($TiO_2$) as well as Lewis acids including oxides of transition metals such as copper (Cu), cobalt (CO), nickel (Ni) and iron (Fe)) absorb $NH_3$ when the temperature is low. Therefore, one or more of these acidic inorganic substances may be carried on the substrate of the $NH_3$ decomposing catalyst, or the substrate itself may be formed by a porous material made of such acidic inorganic substances to prevent the outflow of $NH_3$ in the low temperature region. In this case, the $NH_3$ component which is not converted to an $N_2$ component in the lower temperature is absorbed by the acidic inorganic substances in the $NH_3$ decomposing catalyst, and the amount of the outflow of the $NH_3$ from the $NH_3$ decomposing catalyst in the low temperature region can be reduced. The $NH_3$ absorbed by the acidic inorganic substances are released when the temperature of the $NH_3$ decomposing catalyst becomes high, or when the concentration of $NH_3$ component in the exhaust gas becomes low. Therefore, the $NH_3$ absorbed by the acidic inorganic substance is converted to $N_2$ by the $NH_3$ decomposing catalyst when it is released from the acidic inorganic substance. When the temperature of the exhaust gas flowing into the $NH_3$ decomposing catalyst changes in a wide range, therefore, it is suitable to use these acidic inorganic substances to prevent the outflow Of $NH_3$ in low temperature region.

Next, embodiments of the present invention which utilizes the $NH_3$ decomposing catalyst are explained.

Figure 1:
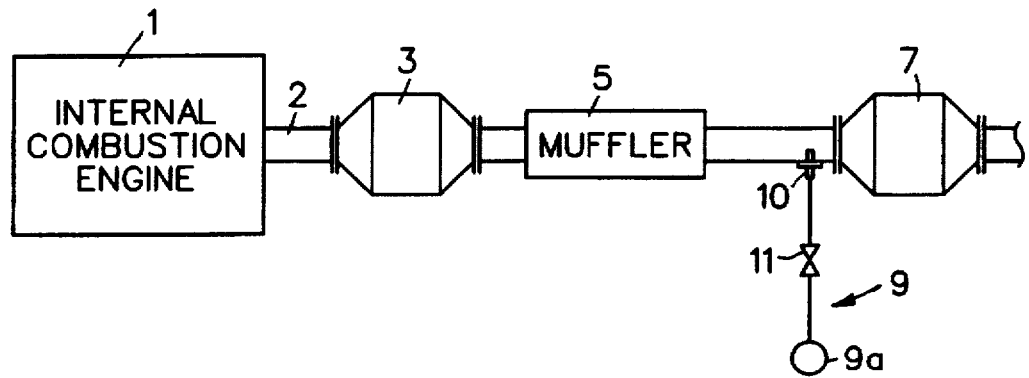
FIG. 1 is a drawing schematically illustrating an embodiment of the present invention when applied to an automobile engine.

FIG. 1 schematically illustrates an embodiment of the present invention when applied to an internal combustion engine. In FIG. 1, reference numeral 1 represents an internal combustion engine, 2 represents an exhaust gas passage of the engine 1. On the exhaust gas passage, a three-way reducing and oxidizing catalyst 3, a muffler 5 and a $NH_3$ decomposing catalyst 7 are disposed, from the upstream end, in this order. Numeral 9 in FIG. 6 designates a secondary air supply unit which injects air into the exhaust gas passage at the portion between the muffler 5 and $NH_3$ decomposing catalyst 7.

The three-way reducing and oxidizing catalyst 3 is a known type which uses, for example, a honeycomb type substrate. On this substrate, an alumina layer which acts as a carrier of the catalytic components is applied. In this embodiment, catalytic components of precious metals such as platinum (Pt), palladium (Pd) and rhodium (Rh) and additives such as cerium (Ce) are attached to the alumina carrier. As is well known, the three-way reducing and oxidizing catalyst 3 can resolve HC, CO and $NO_x$ components in the exhaust gas effectively when the air-fuel ratio of the exhaust gas is near the stoichiometric air-fuel ratio. On the other hand, when the air-fuel ratio of the exhaust gas is on a rich side compared to the stoichiometric air-fuel ratio, the three-way reducing and oxidizing catalyst reduces substantially all of $NO_x$ in the exhaust gas, but, in this case, a portion of $NO_x$ in the exhaust gas is converted to $NH_3$ at the same time. Namely, the three-way reducing and oxidizing catalyst 3 can act as an $NH_3$ synthesizing catalyst when the air-fuel ratio of the exhaust gas flowing into the catalyst is rich compared to the stoichiometric air-fuel ratio.

The muffler 5 is a conventional type which lowers the sound pressure level by expanding the exhaust gas, and in this embodiment, also used for reducing the temperature of the exhaust gas by expanding it. Further, since the muffler 5 has a relatively large heat capacity, the change in the temperature of the exhaust gas at downstream of the muffler 5 can be kept small even when the temperature of the exhaust gas at upstream of the muffler 5 changes due to the change in the operating conditions of the engine 1 occurs.

As explained before, the $NH_3$ decomposing catalyst 7 is capable of resolving all of the $NH_3$ in the exhaust gas when the exhaust gas flowing into the catalyst 7 is in an oxidizing atmosphere and the temperature of the catalyst 7 is within the optimum temperature range. However, when the temperature of the catalyst becomes lower than the optimum temperature range, an outflow of $NH_3$ occurs. To prevent this outflow of $NH_3$ in the low temperature region, the acidic inorganic substance may be attached to the substrate of the $NH_3$ decomposing catalyst or the substrate itself may be formed by a porous material made of the acidic inorganic substance.

The secondary air supply unit 9 includes a pressurized air source 9a such as an air pump, nozzle 10 for injecting air into the exhaust gas passage upstream of the $NH_3$ decomposing catalyst 7 and a shut off valve 11 disposed on the piping connecting the air source 9a and the nozzle 10. As explained later, a flow control valve which is capable of adjusting the amount of air injected from the nozzle 10 may be used instead of the shut off valve 11.

In this embodiment, the internal combustion engine 1 is operated at an air-fuel ratio near the stoichiometric air-fuel ratio and the air-fuel ratio of the exhaust gas from the engine 1 is usually maintained at the stoichiometric air-fuel ratio. Since the three-way reducing and oxidizing catalyst 3 can resolve the HC, CO and $NO_x$ components in the exhaust gas at a high efficiency when the air-fuel ratio is near the stoichiometric air-fuel ratio, the exhaust gas flowing out from the three-way reducing and oxidizing catalyst 3 usually does not contain any HC, CO and $NO_x$ components. However, even if the operating air-fuel ratio of the engine 1 is maintained near the stoichiometric air-fuel ratio, the air-fuel ratio of the exhaust gas occasionally becomes rich compared to the stoichiometric air-fuel ratio due to the fluctuations of the operating air-fuel ratio of the engine. In such a case, a portion of $NO_x$ in the exhaust gas is converted to $NH_3$ by the three-way reducing and oxidizing catalyst 3. Thus, the exhaust gas flowing out from the three-way reducing and oxidizing catalyst 3 sometimes contains a small amount of $NH_3$.

In this embodiment, the $NH_3$ decomposing catalyst 7 is disposed on the exhaust gas passage downstream of the three-way reducing and oxidizing catalyst 3 in order to resolve the $NH_3$ formed at the three-way reducing and oxidizing catalyst 3. Namely, the exhaust gas flows out from the three-way reducing and oxidizing catalyst 3 flows down the exhaust gas passage 2 and passes through the muffler 5. Further, air is added to the exhaust gas before it flows into the $NH_3$ decomposing catalyst 7 by the secondary air supply unit 9.

Usually, the temperature of the exhaust gas at the outlet of the engine 1 is above the optimum temperature range of the $NH_3$ decomposing catalyst 7. However, the temperature of the exhaust gas becomes lower as the exhaust gas flows down the exhaust gas passage due to the heat dissipation through the wall of the exhaust gas passage 2. Further, when it passes through the muffler 5, the exhaust gas is cooled by the muffler 5. Therefore, the temperature of the exhaust gas when it reaches the $NH_3$ decomposing catalyst 7 is lower than the temperature at the outlet of the engine 1. In this embodiment, the length of the exhaust gas passage between the engine 1 and the $NH_3$ decomposing catalyst 7 as well as the capacity of the muffler 5 is determined in such a manner that the temperature of the exhaust gas at the inlet of the $NH_3$ decomposing catalyst 7 falls in the optimum temperature range even when the engine 1 is operated at the maximum exhaust temperature conditions. By this arrangement, the temperature of the exhaust gas flowing into the $NH_3$ decomposing catalyst 7, and the temperature of the $NH_3$ decomposing catalyst 7 accordingly, is always maintained within the optimum temperature range regardless of the change in the operating conditions of the engine 1.

Further, the air-fuel ratio of the exhaust gas flowing into the $NH_3$ decomposing catalyst 7 is adjusted by supplying air from the secondary air supply unit 9 so that the air-fuel ratio of the exhaust gas becomes lean compared to the stoichiometric air-fuel ratio. As explained before, when the exhaust gas flowing into the $NH_3$ decomposing catalyst 7 is in an oxidizing atmosphere (i.e., at a lean air-fuel ratio), the $NH_3$ decomposing catalyst 7 is capable of resolving substantially all of the $NH_3$ in the exhaust gas regardless of the degree of the leanness of the air-fuel ratio of the exhaust gas. Therefore, it is not necessary to control the amount of air supplied from the secondary air supply unit 9 in order to strictly control the air-fuel ratio of the exhaust gas flowing into the $NH_3$ decomposing catalyst 7 in this embodiment. The amount of the air supplied from the secondary air supply unit 9 is set at an amount which can keep the air-fuel ratio of the exhaust gas flowing into the $NH_3$ decomposing catalyst 7 on a lean air-fuel ratio side compared to the stoichiometric air-fuel ratio even when the operating air-fuel ratio of the engine 1 fluctuates to the rich air-fuel ratio side compared to the stoichiometric air-fuel ratio.

By the arrangement explained above, the exhaust gas supplied to the $NH_3$ decomposing catalyst 7 is always an oxidizing atmosphere and has a temperature within the optimum temperature range. Therefore, even if $NH_3$ is formed at the three-way reducing and oxidizing catalyst 3, $NH_3$ is completely resolved by the $NH_3$ decomposing catalyst 7. Further, when the air-fuel ratio of the exhaust gas becomes rich, the capability of the three-way reducing and oxidizing catalyst 3 for resolving HC and CO component in the exhaust gas decreases. However, according to the present embodiment, HC and CO components passing through the three-way reducing and oxidizing catalyst 3 are also resolved by the $NH_3$ decomposing catalyst 7. Therefore, according to the present embodiment, an increase in the emission of HC, CO and $NH_3$ components when the operating air-fuel ratio of the engine fluctuates to rich side can be prevented.

Though the temperature of the exhaust gas is adjusted by the heat dissipation from the wall of the exhaust gas passage 2 and the cooling by the muffler 5 in this embodiment, other means for adjusting the temperature of the exhaust gas may be used. For example, heat radiation fins may be disposed outer wall of the exhaust gas passage 2 instead of, or in addition to the muffler 5, or alternatively, the wall of the exhaust gas passage 2 may be water-cooled to increase the cooling capacity of the exhaust gas passage 2. Further, the amount of the air supplied from the secondary air supply unit 9 may be changed in accordance with the temperature of the exhaust gas to maintain the temperature of the exhaust gas flowing into the $NH_3$ decomposing catalyst 7 within the optimum temperature range by using a flow control valve instead of the shut off valve 11 in this embodiment. Further, the flow amount of the cooling water for cooling the exhaust gas passage wall, or the amount of the air supplied from the secondary air supply unit may be feedback controlled in accordance with an output signal of a temperature sensor detecting the catalyst bed of the $NH_3$ decomposing catalyst 7 in such a manner that the temperature of the $NH_3$ decomposing catalyst is maintained within the optimum temperature range.

Figure 7:
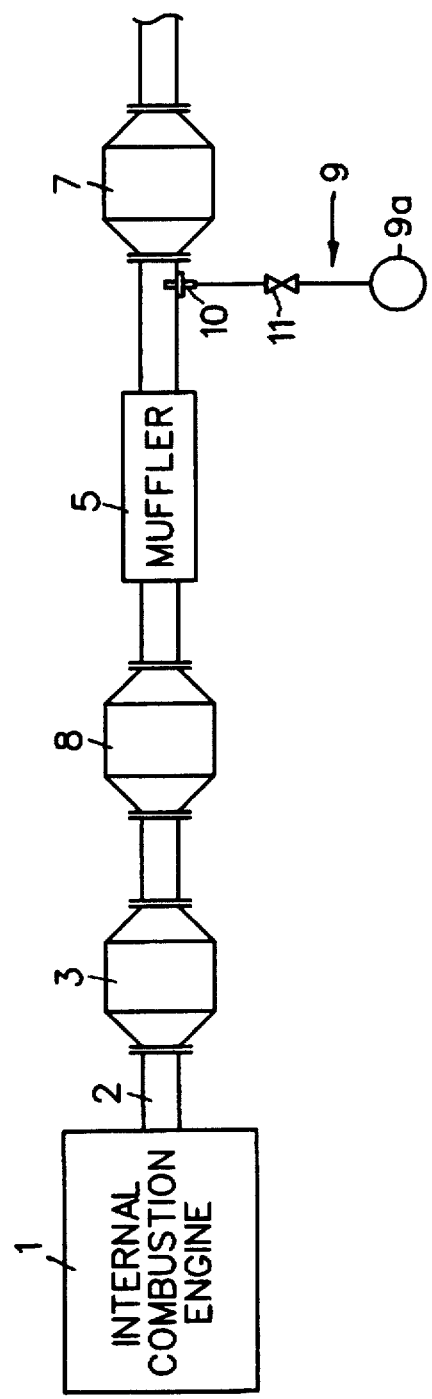
FIG. 7 is a drawing schematically illustrating another embodiment of the present invention.

In the above embodiment, if the operating air-fuel ratio of the engine 1 fluctuates to a lean air-fuel ratio side compared to the stoichiometric air-fuel ratio, $NH_3$ is not formed at the three-way reducing and oxidizing catalyst 3, and the capability of the three-way reducing and oxidizing catalyst for reducing $NO_x$ also decreases. In this case, an exhaust gas which contains $NO_x$, but does not contain $NH_3$ flows into the $NH_3$ decomposing catalyst 7. This causes the $NO_x$ in the exhaust gas to pass through the $NH_3$ decomposing catalyst 7 without being reduced. Therefore, to prevent the emission of the $NO_x$ when the operating air-fuel ratio becomes lean, a $NO_x$ absorbent which is capable of absorbing $NO_x$ in the exhaust gas of a lean air-fuel ratio, or a $NO_x$ reducing catalyst which has a capability for selectively reducing the $NO_x$ in the exhaust gas even in an oxidizing atmosphere may be disposed on the exhaust gas passage 2 between the three-way reducing and oxidizing catalyst 3 and the $NH_3$ decomposing catalyst 7. FIG. 7 shows an embodiment of the present invention in which a $NO_x$ absorbent or a $NO_x$ reducing catalyst is disposed on the exhaust gas passage 2 between the three-way reducing and oxidizing catalyst 3 and the $NH_3$ decomposing catalyst 7. In FIG. 7, same reference numerals as those in FIG. 1 represent same elements. Reference numeral 8 in FIG. 7 designates an $NO_x$ absorbent or $NO_x$ reducing catalyst disposed on the exhaust gas passage between the three-way reducing and oxidizing catalyst 3 and the $NH_3$ decomposing catalyst 7 (in FIG. 7, the $NO_x$ absorbent 8 or the $NO_x$ reducing catalyst is disposed between the three-way reducing and oxidizing catalyst 3 and the muffler 5. However, the $NO_x$ absorbent 8 or the $NO_x$ reducing catalyst may be disposed between the muffler 5 and the $NH_3$ decomposing catalyst 7). In this embodiment, when the operating air-fuel ratio of the engine fluctuates to lean side, $NO_x$ passes through the three-way reducing and oxidizing catalyst 7 is absorbed by the $NO_x$ absorbent 8 or reduced by the $NO_x$ reducing catalyst 8. Therefore, $NO_x$ is not contained in the exhaust gas flowing into the $NH_3$ decomposing catalyst 7 even when the operating air-fuel ratio of the engine fluctuates to lean air-fuel ratio side.

Though the NO$_x$ absorbent 8 in this embodiment is disposed on the exhaust gas passage 2 separately, it is possible to give the absorbing and releasing capability of NO$_x$ to the substrate of the NH$_3$ decomposing catalyst. This is accomplished by attaching the NO$_x$ absorbing substances (explained later) to the substrate of the NH$_3$ decomposing catalyst 7 in addition to the catalytic components.

The NO$_x$ absorbent and the NO$_x$ reducing catalyst will be explained later in detail.

Next, another embodiment of the present invention is explained. Though the engine 1 in the previous embodiment is operated near the stoichiometric air-fuel ratio, the engine in this embodiment is operated at a slightly rich air-fuel ratio in such a manner that an excess air ratio λ falls in the range between 0.95 and 0.98. Since the construction of the device of the present embodiment is the same as that of the previous embodiment, the present embodiment is also explained with reference to FIG. 1.

In the previous embodiment, the operating air-fuel ratio of the engine 1 fluctuates to the lean air-fuel ratio side as well as to the rich air-fuel ratio side due to the change in the operating conditions. When the operating air-fuel ratio of the engine becomes lean, the NO$_x$ components in the exhaust gas pass through the three-way reducing and oxidizing catalyst 3 without being reduced. Further, since the three-way reducing and oxidizing catalyst 3 does not produce NH$_3$ when the air-fuel ratio of the exhaust gas is lean, the NH$_3$ decomposing catalyst 7 cannot resolve the NO$_x$ components in the exhaust gas. To prevent this, the engine 1 in this embodiment is operated at slightly rich air-fuel ratio so that the operating air-fuel ratio does not become lean compared to the stoichiometric air-fuel ratio even when the operating air-fuel ratio of the engine 1 fluctuates to some extent.

Since the engine 1 is operated at a rich air-fuel ratio in normal operation, NH$_3$ is formed at the three-way reducing and oxidizing catalyst 3 during the normal operation of the engine 1, and the amounts of the HC, CO components in the exhaust gas also increases in the normal operation of the engine 1 in this embodiment. However, the NH$_3$ formed at the three-way reducing and oxidizing catalyst 3 and the HC, CO components passes through the three-way reducing and oxidizing catalyst 3 are both resolved by the NH$_3$ decomposing catalyst 7 in this embodiment. Therefore, the emission of NH$_3$, as well as HC and CO, does not occur in this embodiment. As explained above, according to the present embodiment, the emission of the NH$_3$, HC and CO components are reduced by operating the engine 1 at a slightly rich air-fuel ratio.

Next, another embodiment is explained with reference to FIG. 2.

Figure 2:
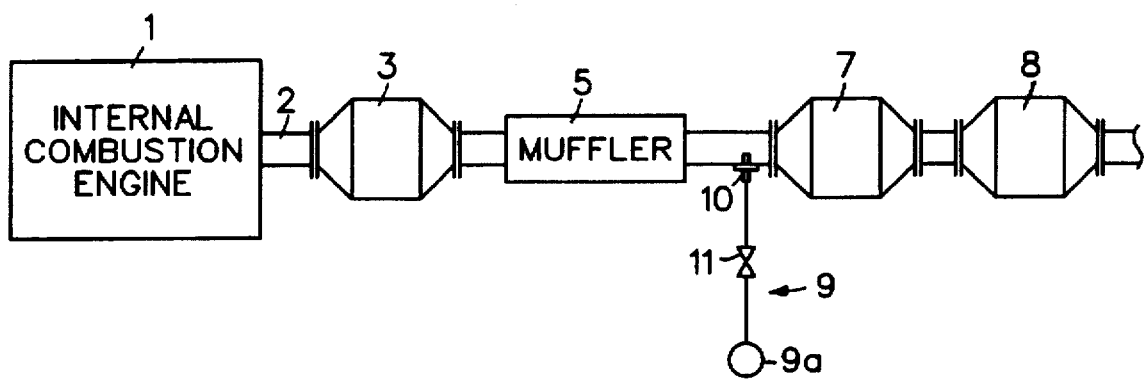
FIG. 2 is a drawing schematically illustrating another embodiment of the present invention.

In FIG. 2, the same reference numerals as those in FIG. 1 represent the same elements. The embodiment in FIG. 2 is different from the embodiment in FIG. 1 in that an NO$_x$ absorbent 8 is disposed on the exhaust gas passage 2 downstream of the NH$_3$ decomposing catalyst 7. The NO$_x$ absorbent 8 absorbs NO$_x$ in the exhaust gas when the air-fuel ratio of the exhaust gas is lean compared to the stoichiometric air-fuel ratio. The NO$_x$ absorbent 8 in this embodiment uses, for example, alumina as a carrier and, on this carrier, precious metals such as platinum (Pt) rhodium (Rh), and at least one substance selected from alkali metals such as potassium (K), sodium (Na), lithium (Li) and cesium (Cs); alkali-earth metals such as barium (Ba) and calcium (Ca); and rare-earth metals such as lanthanum (La) and yttrium (Y) is carried. The NO$_x$ absorbent 8 absorbs NO$_x$ in the exhaust gas when the air-fuel ratio of the exhaust gas is lean, and releases the absorbed NO$_x$ when the oxygen concentration of the exhaust gas flowing the NO$_x$ absorbent becomes lower.

Though the mechanism of this absorption and releasing operation of the NO$_x$ absorbent is not clear at present, it is considered that the absorption and releasing operation is conducted by the following mechanism. Though the following mechanism of the absorption and the releasing operation of the NO$_x$ absorbent is explained for the case where platinum Pt and barium (Ba) are carried on the carrier, as an example, it is considered that a similar mechanism also applies even if other precious metal, alkali metals, alkali earth metals, or rare earth metals are used.

Namely, when the concentration of O$_2$ in the exhaust gas increases, i.e., when the air-fuel ratio of the exhaust gas becomes lean, the oxygen O$_2$ in the exhaust gas is deposited on the surface of platinum (Pt) in the form of O$_2$- or O$^{2+}$. The NO in the exhaust gas reacts with O$_2$- or O$^{2-}$ on the surface of the platinum (Pt) and becomes NO$_2$ (2NO+O$_2$→2NO$_2$). Then, NO$_2$ in the exhaust gas and the NO$_2$ produced on the platinum (Pt) are further oxidized on the surface of platinum (Pt) and absorbed into the NO$_x$ absorbent while bonding with the barium oxide (BaO) and diffusing in the absorbent in the form of nitric acid ions NO$_3$-. Thus, NO$_x$ in the exhaust gas is absorbed by the NO$_x$ absorbent 8 when the air-fuel ratio of the exhaust gas is lean.

On the other hand, when the oxygen concentration in the exhaust gas becomes low, i.e., when the air-fuel ratio of the exhaust gas becomes rich, the production of NO$_2$ on the surface of the platinum (Pt) is lowered and the reaction proceeds in an inverse direction (NO$_3$-→NO$_2$), and thus nitric acid ions NO$_3$- in the absorbent are released in the form of NO$_2$ from the NO$_x$ absorbent 8.

In this case, if the reducing substance such as NH$_3$ and CO, or the substance such as HC and CO$_2$ exist in the exhaust gas, the released NO$_x$ is reduced on the platinum Pt by these components. Namely, the NO$_x$ absorbent 8 performs the absorbing and releasing operation of the NO$_x$ in the exhaust gas in which the NO$_x$ in the exhaust gas is absorbed by the NO$_x$ absorbent when the air-fuel ratio of the exhaust gas is lean and released from the NO$_x$ absorbent when the air-fuel ratio of the exhaust gas becomes rich.

As explained in FIG. 6, the NH$_3$ decomposing catalyst 7 converts the NH$_3$ in the exhaust gas to NO$_x$ when the temperature becomes higher than the optimum temperature range. Therefore, if the exhaust gas temperature at the outlet of the engine 1 becomes very high in an extreme operating condition of the engine 1, the temperature maintaining means such as the muffler 5 might be insufficient to lower the exhaust gas temperature to the optimum temperature range of the NH$_3$ decomposing catalyst 7. In such a case, since the temperature of the exhaust gas flowing into the NH$_3$ decomposing catalyst 7 exceeds the optimum temperature range, NO$_x$ is formed at the NH$_3$ decomposing catalyst 7 and is discharged to atmosphere.

In this embodiment, the NO$_x$ absorbent 8 is disposed on the exhaust gas passage 2 downstream of the NH$_3$ decomposing catalyst 7 to prevent the emission of the NO$_x$ in the extremely high exhaust gas temperature conditions. Since the NO$_x$ absorbent 8 absorbs the NO$_x$ in the exhaust gas in an oxidizing atmosphere, the NO$_x$ formed at the NH$_3$ decomposing catalyst 7 in the extremely high exhaust gas temperature condition is absorbed by the NO$_x$ absorbent 8 and the emission of the NO$_x$ to the atmosphere does not occur.

As explained above, according to the present embodiment, the exhaust emission can be always kept low even when the exhaust gas temperature becomes extremely high.

Though the $NO_x$ absorbent 8 in the above embodiment is disposed on the exhaust gas passage 2 separately, it is possible to give the absorbing and releasing capability of $NO_x$ to the substrate of the $NH_3$ decomposing catalyst. This is accomplished by attaching the $NO_x$ absorbing substances such as alkali metals and alkali-earth metals to the substrate of the $NH_3$ decomposing catalyst 7 in addition to the catalytic components.

Next, another embodiment of the present invention is explained. In this embodiment, an $NO_x$ reducing catalyst is disposed on the exhaust gas passage downstream of the $NH_3$ decomposing catalyst 7 instead of the $NO_x$ absorbent 8 in FIG. 2. Other constructions of this embodiment are the same as those in FIG. 2. Therefore, illustration of this embodiment by drawings is omitted.

The $NO_x$ reducing catalyst in this embodiment has a substrate made of, for example, zeolite ZSM-5, and metals such as copper (Cu) and iron (Fe) are attached to the substrate by an ion exchange method. Alternatively, a substrate made of zeolite such as mordenite and precious metal such as platinum (Pt) attached thereon can also be used as the $NO_x$ reducing catalyst. The $NO_x$ reducing catalyst traps $NH_3$, HC and CO components in the exhaust gas in the pores of the porous zeolite, and selectively reduces the $NO_x$ in the exhaust gas using these trapped components even in an oxidizing atmosphere.

In this embodiment, the $NO_x$ reducing catalyst disposed at downstream of the $NH_3$ decomposing catalyst 7 in FIG. 2 traps the $NH_3$ component in the exhaust gas which passes through the $NH_3$ decomposing catalyst 7 when the exhaust gas temperature is below the optimum temperature range as well as the HC and CO components in the exhaust gas. Further, when the exhaust gas temperature is above the optimum temperature range, the $NO_x$ reducing catalyst selectively reduces the $NO_x$ formed at the $NH_3$ decomposing catalyst 7 using the trapped $NH_3$, HC and CO components. Therefore, according to the present embodiment, the $NO_x$ formed at the $NH_3$ decomposing catalyst in the high exhaust gas temperature conditions is not emitted to atmosphere and the exhaust emissions are always maintained at low level regardless of the change in the operating conditions of the engine.

Figure 3:
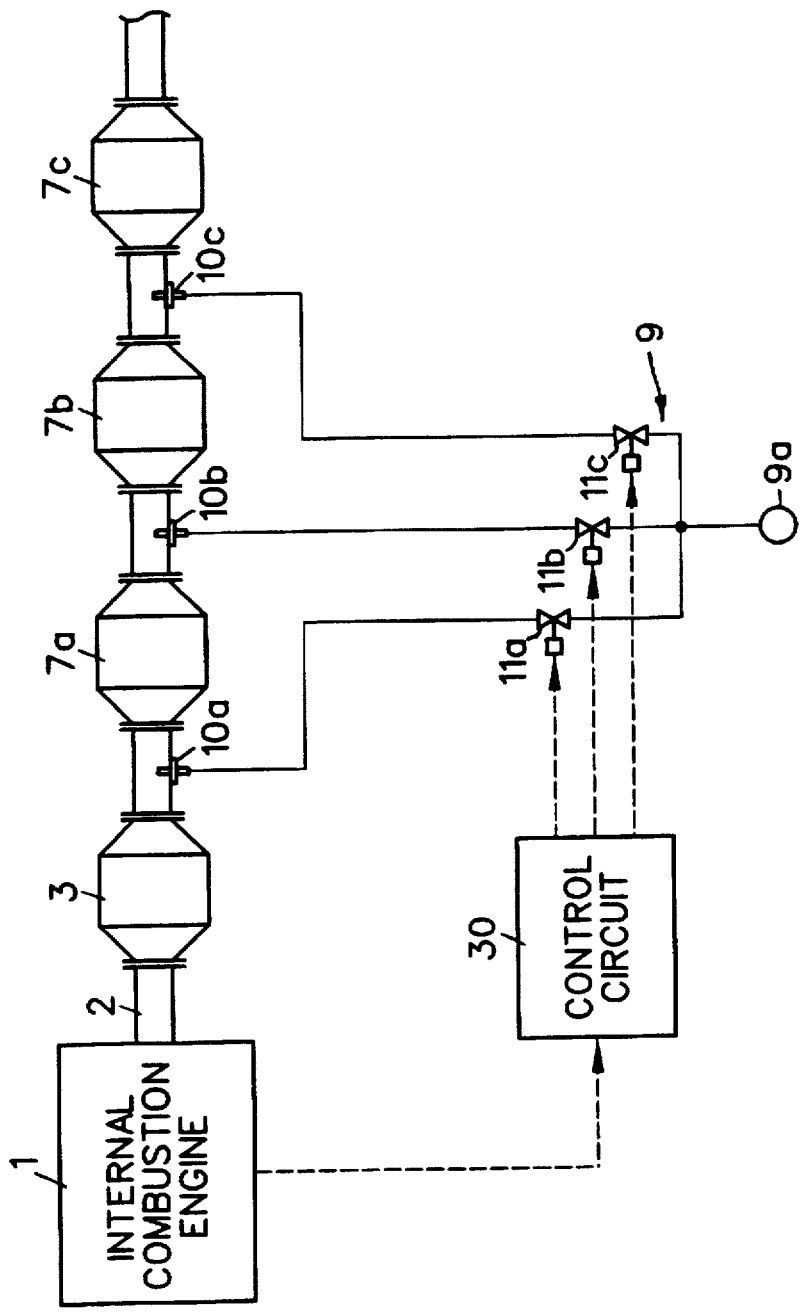
FIG. 3 is a drawing schematically illustrating another embodiment of the present invention.

Next another embodiment of the present invention is explained with reference to FIG. 3. In FIG. 3, the same reference numerals as those in FIG. 1 designate the same elements.

In this embodiment, means for cooling the exhaust gas such as the muffler 5 in FIG. 1 is not used. Further, a plurality of the $NH_3$ decomposing catalyst are disposed on the exhaust gas passage 2 downstream of the three-way reducing and oxidizing catalyst 3 (FIG. 3 shows the case in which three $NH_3$ decomposing catalyst 7a to 7c are used). Also, the secondary air supply unit 9 in this embodiment has a plurality of the nozzles 10a to 10c which are each disposed, in the exhaust gas passage 2, at the inlet of the respective $NH_3$ decomposing catalysts 7a to 7c. Reference numeral 30 in FIG. 3 designates a control circuit of the engine 1. The control circuit 30 may be comprises, for example, a micro-computer of known type and performs basic controls of the engine 1 such as a fuel infection control and an ignition timing control. In this embodiment, the control circuit 30 also act as selecting means which selects the nozzles of the secondary air supply unit 9 in accordance with the exhaust gas temperature discharged from the engine 1 to supply air to the $NH_3$ decomposing catalysts which is in the optimum temperature range. To perform these controls, signals representing the operating condition of the engine 1 such as the inlet air flow amount and the speed of the engine 1 are fed to the control circuit 30 from the respective sensors not shown in the drawing. Further, the control circuit 30 is connected to shut off valves 11a to 11c which are disposed on the piping connecting the pressurized air source 9a and the respective nozzles 10a to 10c to control the operation of these shut off valves.

The temperature of the exhaust gas becomes lower as it flows down the exhaust gas passage 2 due to the heat dissipation through the passage wall during the operation of the engine 1. Since plural $NH_3$ decomposing catalysts are disposed on the exhaust gas passage 2 in series in this embodiment, the temperature of the exhaust gas flowing into the respective $NH_3$ decomposing catalysts are different. Therefore, the temperature of the respective $NH_3$ decomposing catalysts are also different from each other in this embodiment. Further, the length of the exhaust gas passage 2 between the engine 1 and the respective $NH_3$ decomposing catalysts are determined in such a manner that the temperature of at least one $NH_3$ decomposing catalysts falls in the optimum temperature range throughout the whole operating range of the engine 1. Namely, at least one $NH_3$ decomposing catalyst is maintained at a temperature within the optimum temperature range in this embodiment regardless of the change in the operating conditions of the engine 1.

During the operation of the engine 1, the control circuit 30 determines the temperature of the respective $NH_3$ decomposing catalysts based on the operating conditions of the engine, and supplies air to the $NH_3$ decomposing catalyst(s) which has a temperature within the optimum temperature range by activating the shut off valve connected to the nozzle at the inlet of that $NH_3$ decomposing catalyst(s). Thus, secondary air is supplied only to the $NH_3$ decomposing catalyst(s) which has a temperature within the optimum temperature range. The temperature of the respective $NH_3$ decomposing catalysts change in accordance with the temperature of the exhaust gas at the outlet of the engine 1 (i.e., the engine load) and the amount of the exhaust gas flow (i.e., the engine speed). In this embodiment, the temperature of the respective $NH_3$ decomposing catalysts are previously measured using the actual engine under various engine loads and speed conditions, and the $NH_3$ decomposing catalysts to which air is supplied (i.e., the $NH_3$ decomposing catalysts having a temperature within the optimum temperature range) are determined previously in accordance with the engine load and speed and stored in the memory of the control circuit 30. The control circuit 30 determines the $NH_3$ decomposing catalysts to which the air should be supplied, in accordance with the engine load and speed during the engine operation, and opens the shut off valves connected to the air nozzles at the inlet of those $NH_3$ decomposing catalysts.

Therefore, according to the present embodiment, the $NO_x$ and the $NH_3$ in the exhaust gas are effectively resolved regardless of the change in the exhaust gas temperature at the outlet of the engine by using the $NH_3$ decomposing catalyst which has the temperature within the optimum temperature range. Further, it is known that the catalytic components of the $NH_3$ decomposing catalyst which are precious metals such as platinum (Pt), rhodium (Rh) and palladium (Pd) also act as three-way reducing and oxidizing catalyst when the temperature is higher than the optimum temperature range. Therefore, these precious metal catalytic components may be used for the $NH_3$ decomposing catalysts located upstream (for example, $NH_3$ decomposing catalysts 7a and 7b in FIG. 3). In this case, the upstream $NH_3$ decomposing catalysts act as supplementary three-way reducing and oxidizing catalysts when the temperature of the upstream $NH_3$ decomposing catalysts are higher than the optimum temperature range, and the $NH_3$ and $NO_x$ in the exhaust gas are resolved by the $NH_3$ decomposing catalysts located downstream.

Though three $NH_3$ decomposing catalysts are used in the present embodiment, the number of the $NH_3$ decomposing catalysts is not limited to three, i.e., two or more $NH_3$ decomposing catalysts may be used in accordance with the type of the engine and the arrangement of the exhaust gas system. Further, the catalytic components used for the $NH_3$ decomposing catalysts may be the same for all the $NH_3$ decomposing catalysts, or different components for respective $NH_3$ decomposing catalysts may be used. Further, means for cooling the exhaust gas such as the muffler 5 used in the embodiment in FIG. 1 can be used also in this embodiment to lower the exhaust gas temperature.

Further, though the control circuit 30 selects the $NH_3$ decomposing catalysts having a temperature within the optimum temperature range based on the operating condition of the engine 1, the $NH_3$ decomposing catalyst may be selected based on the actual temperature measured by temperature sensors disposed on the exhaust gas passage at the inlet of the respective $NH_3$ decomposing catalysts, or by temperature sensors disposed on the catalyst beds of the respective $NH_3$ decomposing catalysts.

Next, another embodiment of the present invention is explained with reference to FIG. 4. In the embodiments explained above, the present invention is applied to the system in which the internal combustion engine is operated at the air-fuel ratio near the stoichiometric air-fuel ratio, or lower than the stoichiometric air-fuel ratio (i.e., the rich air-fuel ratio). However, in this embodiment, the present invention is applied to an engine operated at an air-fuel ratio higher than the stoichiometric air-fuel ratio (i.e., a so-called lean burn engine).

Figure 4:
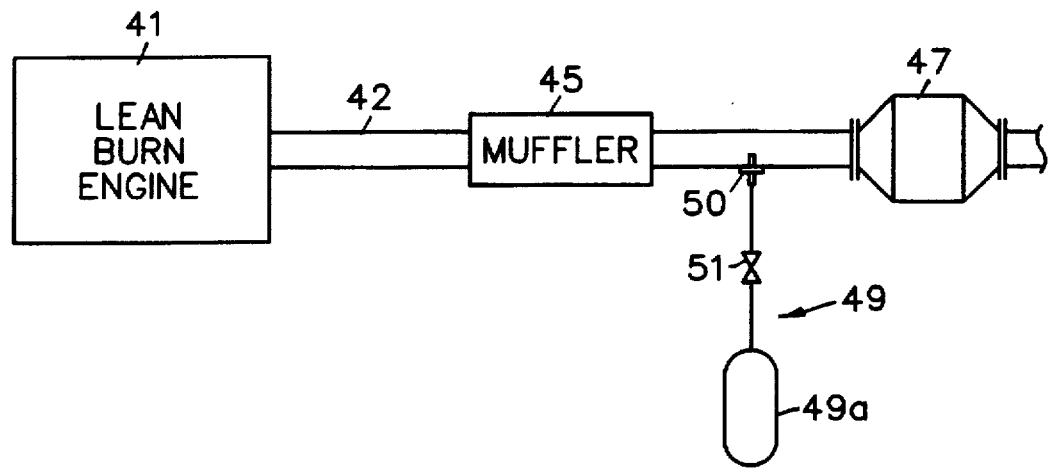
FIG. 4 is a drawing schematically illustrating another embodiment of the present invention.
Figure 5:
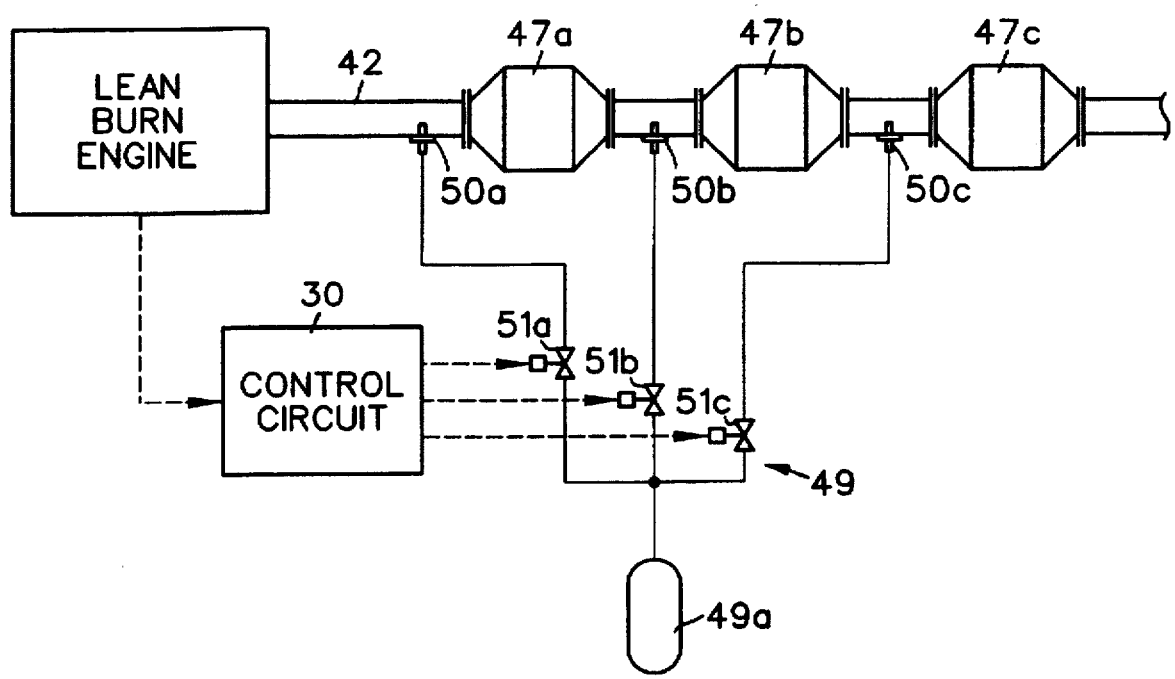
FIG. 5 is a drawing schematically illustrating another embodiment of the present invention.

In FIG. 4, reference numeral 41 designates an lean burn engine which is operated at an air-fuel ratio higher than the stoichiometric air-fuel ratio, 42 designates an exhaust gas passage of the engine 41. A muffler 45 and a $NH_3$ decomposing catalyst 47 which are similar to the muffler 5 and the $NH_3$ decomposing catalyst 7 in FIG. 1, respectively, are disposed on the exhaust gas passage 42. However, a three-way reducing and oxidizing catalyst 3 as shown in FIG. 5 is not provided in this embodiment. Further, instead of the secondary air supply unit 9 in FIG. 1, an $NH_3$ supply unit 49 which comprises a nozzle 50 and a shut off valve 51 which are similar to those in FIG. 1 and a $NH_3$ supply source 49a such as a bottle containing gaseous or liquid $NH_3$ is provided in this embodiment.

In this embodiment, the exhaust gas in an oxidizing atmosphere from the lean burn engine 41 is cooled by the muffler 45 and flows into the $NH_3$ decomposing catalyst 47 at the temperature within the optimum temperature range. Further, $NH_3$ is added to the exhaust gas at the portion upstream of the $NH_3$ decomposing catalyst 47. The exhaust gas from the lean burn engine 41 contains a relatively large amount of $NO_x$. Thus, the exhaust gas flowing into the $NH_3$ decomposing catalyst is adjusted so that it becomes an oxidizing atmosphere and a temperature within the optimum temperature range. Further, the exhaust gas contains $NO_x$ and $NH_3$. Therefore, both the $NO_x$ and the $NH_3$ in the exhaust gas are completely resolved by the $NH_3$ decomposing catalyst 47.

As explained before, the capability of the three-way reducing and oxidizing catalyst for reducing the $NO_x$ becomes very small when the exhaust gas is in an oxidizing atmosphere. Therefore, it is difficult to resolve the $NO_x$ in the exhaust gas of the lean burn engine using the three-way reducing and oxidizing catalyst. However, according to the present invention, the $NO_x$ in the exhaust gas from the lean burn engine can be completely resolved by the $NH_3$ decomposing catalyst 47.

Further, the method for resolving $NO_x$ in the exhaust gas of in an oxidizing atmosphere by adding an $NH_3$ component to the exhaust gas and using a conventional vanadia-titania ($V_2O_5$-$TiO_2$) type denitrating catalyst is known in the art. In the above conventional method, $NO_x$ and $NH_3$ are converted to $N_2$ and $H_2O$ by the denitrating reactions ($8NH_3$+ $6NO_2 \rightarrow 12H_2O + 7N_2$ and/or $4NH_3 + 4NO_2 + O_2 \rightarrow 6H_2O + 4N_2$). However, in the conventional method, the amount of $NO_x$ components and the $NH_3$ component must be adjusted so that the ratio of the moles of $NO_x$ and $NH_3$ are strictly stoichiometrical (i.e., 4:3 or 1:1) in order to react $NO_x$ with $NH_3$ without causing any surplus $NO_x$ and $NH_3$, as explained before.

However, in the actual operation of the engine, the concentration of the $NO_x$ components in the exhaust gas varies widely in accordance with the operating condition of the engine, and it is difficult to control the amount of the $NH_3$ added to the exhaust gas in accordance with the concentration of the $NO_x$ in the exhaust gas. Therefore, if the conventional method is used for an actual engine, $NO_x$ or $NH_3$ is emitted to the atmosphere in some cases.

However, in case of the $NH_3$ decomposing catalyst 47 in this embodiment, it is not required to strictly control the amount of the $NH_3$ added to the exhaust gas since the $NH_3$ decomposing catalyst can convert all of the $NH_3$ in the exhaust gas as long as the exhaust gas is in an oxidizing atmosphere. In this embodiment, it is only required that the amount of the $NH_3$ added to the exhaust gas is sufficiently large to reduce all of the $NO_x$ in the exhaust gas while maintaining the exhaust gas in an oxidizing atmosphere. Therefore, according to the present embodiment, the $NO_x$ in the exhaust gas of the lean burn engine can be completely resolved by a simple control of the $NH_3$ supply unit 49 while preventing the emission of $NH_3$.

FIG. 5 shows another embodiment of the present invention which is similar to the embodiment in FIG. 3. In this embodiment, a plurality of the $NH_3$ decomposing catalysts (47a to 47c in FIG. 5) and $NH_3$ supply nozzles (50a to 50c in FIG. 5) are disposed on the exhaust gas passage 42. Similarly to the embodiment in FIG. 3, the control circuit 30 selects the $NH_3$ decomposing catalyst which is in the optimum temperature range according to the operating conditions of the engine 41, and supplies $NH_3$ to those $NH_3$ decomposing catalysts through the $NH_3$ nozzle located at the inlet of those $NH_3$ decomposing catalysts. Since the operation of the present embodiment is substantially the same as the operation of the embodiment in FIG. 3, a detailed explanation is not given here.

From the description set forth above, it will be understood that, according to the present invention, the $NH_3$ and $NO_x$ components contained in the combustion exhaust gas can be resolved effectively by the $NH_3$ decomposing catalyst. Though the present invention is explained using the embodiments in which the present invention is applied to the internal combustion engine, the application of the present invention is not limited to the internal combustion engine. The present invention can be also applied to resolve the $NH_3$ and $NO_x$ components in the exhaust gas discharged from the combustion devices other than the internal combustion engine. Namely, the present invention can be also applied to, for example, boilers, furnaces etc., which emit combustion exhaust gases.

We claim:

1. A process for resolving $NH_3$ included in a combustion exhaust gas including the steps of:

providing an $NH_3$ decomposing catalyst in an exhaust passage, wherein the catalyst resolves $NH_3$ when the temperature of the catalyst is within a predetermined temperature range and an atmosphere in which the catalyst is located is an oxidizing atmosphere, and the catalyst converts $NH_3$ to $NO_x$ when the temperature of the catalyst is higher than said predetermined temperature range and the atmosphere is an oxidizing atmosphere, and wherein $NH_3$ passes through the catalyst when the temperature of the catalyst is lower than said predetermined temperature range and the atmosphere is an oxidizing atmosphere, so that exhaust gas flowing out of the $NH_3$ decomposing catalyst is substantially free from $NH_3$ and $NO_x$;

directing a flow of exhaust gas including $NH_3$ so that the exhaust contacts the catalyst.

2. A process for resolving pollutants in exhaust gas of an internal combustion engine comprising:

contacting, in a reducing atmosphere, the exhaust gas with an $NH_3$ synthesizing catalyst which, in a reducing atmosphere, converts $NO_x$ components in the exhaust gas to $NH_3$;

adjusting an oxygen content and a temperature of the exhaust gas after it contacts the $NH_3$ synthesizing catalyst so that the exhaust gas is in an oxidizing atmosphere and so that the exhaust gas temperature is within a predetermined temperature range; and contacting the exhaust gas, after its atmosphere and temperature are adjusted, with an $NH_3$ decomposing catalyst which, in an oxidizing atmosphere, resolves $NH_3$ when the temperature of the catalyst is within the predetermined temperature range, converts $NH_3$ in the exhaust gas in an oxidizing atmosphere to $NO_x$ when the temperature of the catalyst is higher than the predetermined temperature range, and allows $NH_3$ to pass through the catalyst when the temperature of the catalyst is lower than the predetermined temperature range.

3. A process according to claim 2, wherein the internal combustion engine is operated at an air-fuel ratio close to the stoichiometric air-fuel ratio, and wherein a three-way reducing and oxidizing catalyst is used as the $NH_3$ synthesizing catalyst.

4. A process according to claim 2, wherein internal combustion engine is operated at an air-fuel ratio lower than the stoichiometric air-fuel ratio, and a three-way reducing and oxidizing catalyst is used as $NH_3$ synthesizing catalyst.

5. A process according to claim 2, wherein, after the exhaust gas has contacted the $NH_3$ synthesizing catalyst and before the exhaust gas has contacted the $NH_3$ absorbing catalyst, the exhaust gas is contacted with an $NO_x$ absorbent which, in an oxidizing atmosphere, absorbs $NO_x$ components.

6. A process according to claim 2, wherein, after the exhaust gas has contacted the $NH_3$ synthesizing catalyst and before the exhaust gas has contacted the $NH_3$ decomposing catalyst, the exhaust gas is contacted with an $NO_x$ reducing catalyst which, in an oxidizing atmosphere, selectively reduces $NO_x$.

7. A process for resolving $NO_x$ from a combustion exhaust gas using an $NH_3$ decomposing catalyst which, in an oxidizing atmosphere with $NH_3$ present, resolves $NO_x$ when the temperature of the catalyst is within a predetermined temperature range, converts $NH_3$ to $NO_x$ when the temperature of the catalyst is higher than said predetermined temperature range, and allows $NH_3$ to pass through the catalyst when the temperature of the catalyst is lower than said predetermined temperature range comprising:

supplying $NH_3$ to a combustion exhaust gas; and contacting the exhaust gas with the $NH_3$ decomposing catalyst in an oxidizing atmosphere and at a temperature within said predetermined temperature range.

8. A process according to claim 1, wherein said $NH_3$ decomposing catalyst contains an $NH_3$ adsorbing component which adsorbs $NH_3$.

9. A process according to claim 2, wherein said $NH_3$ decomposing catalyst contains an $NH_3$ adsorbing component which adsorbs $NH_3$.

10. A process according to claim 7, wherein said $NH_3$ decomposing catalyst contains an $NH_3$ adsorbing component which adsorbs $NH_3$.

11. A process according to claim 8, wherein said $NH_3$ adsorbing component adsorbs $NH_3$ when the temperature is lower than said predetermined temperature range.

12. A process according to claim 9, wherein said $NH_3$ adsorbing component adsorbs $NH_3$ when the temperature is lower than said predetermined temperature range.

13. A process according to claim 10, wherein said $NH_3$ adsorbing component adsorbs $NH_3$ when the temperature is lower than said predetermined temperature range.

* * * * *

UNITED STATES PATENT AND TRADEMARK OFFICE
CERTIFICATE OF CORRECTION

PATENT NO. : 5,783,160
DATED : July 21, 1998
INVENTOR(S) : Bobby Winston Sandage, et. al.

It is certified that error appears in the above-identified patent and that said Letters Patent is hereby corrected as shown below:

Title page, under Other Publications, the Attorneys, Agent, or Firm should read -- Gilberto M. Villacorta, Pepper Hamilton, LLP--.

Signed and Sealed this

Twenty-second Day of August, 2000

Attest:

Q. TODD DICKINSON

*Attesting Officer*      *Director of Patents and Trademarks*

UNITED STATES PATENT AND TRADEMARK OFFICE
CERTIFICATE OF CORRECTION

PATENT NO.   : 5,783,160
DATED        : July 21, 1998
INVENTOR(S)  : Yukio Kinugasa et al.

It is certified that error appears in the above-identified patent and that said Letters Patent is hereby corrected as shown below:

Title page,
Item [73], Assignee, should read: -- Toyota Jidosha Kabushiki Kaisha, Aichi, Japan and Kabushiki Kaisha Toyota Chuo Kenkyusho, Aichi, Japan. --.

Column 7,
Line 37, after "and $N_2$" insert -- components --;
Line 37, after "This $NH_3$" delete "component";

Column 9,
Line 30, change "at least-one" to -- at least one --;

Column 18,
Line 15, change "$O^{2+}$" to -- $O^{2-}$ --;
Line 31, change "$NO_x$absorbent" to -- $NO_x$ absorbent --;

Column 19,
Line 60, change "infection" to -- injection --;

Column 21,
Line 54, after "range" insert -- . --.

This certificate supersedes Certificate of Correction issued August 22, 2000.

Signed and Sealed this

Tenth Day of December, 2002

JAMES E. ROGAN
*Director of the United States Patent and Trademark Office*